Figure 1:
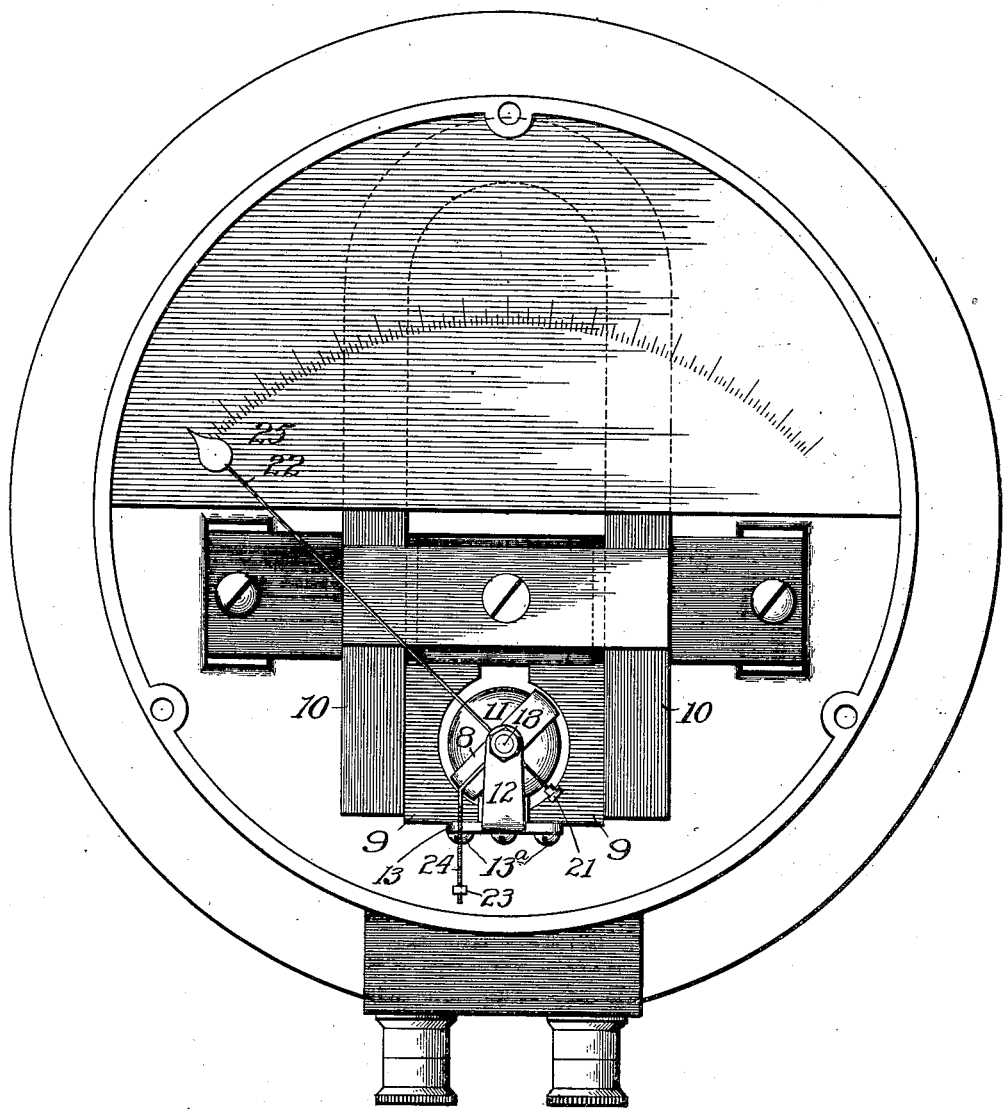

No. 817,857. PATENTED APR. 17, 1906.
J. M. LEA.
ELECTRICAL MEASURING INSTRUMENT.
APPLICATION FILED JULY 31, 1905.

3 SHEETS—SHEET 1.

Witnesses:
Ella Edler
Geo. C. Dawson

Inventor:
John M. Lea,
By Barton & Banner
Attys.

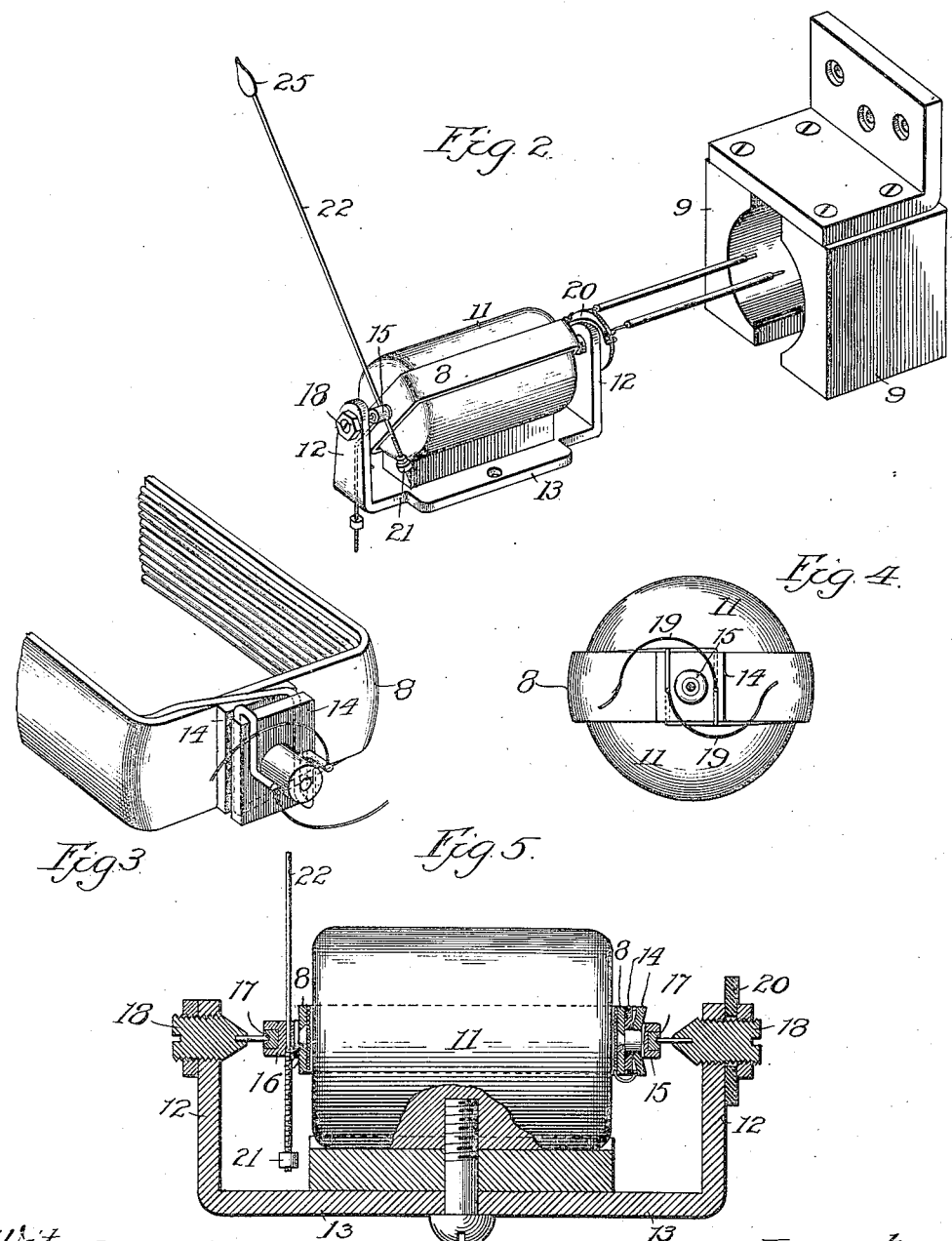

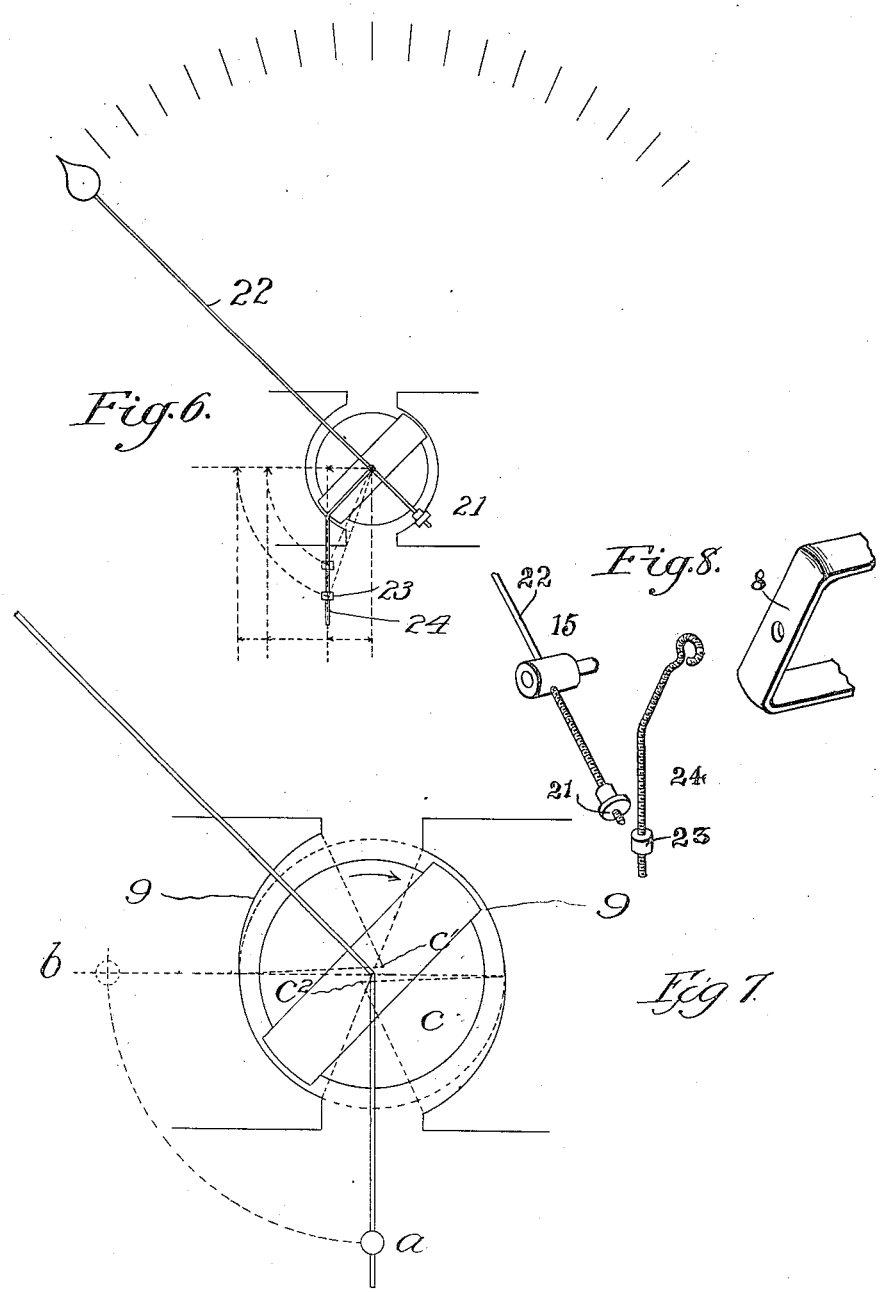

UNITED STATES PATENT OFFICE.

JOHN M. LEA, OF CHICAGO, ILLINOIS, ASSIGNOR TO INTERNATIONAL ELECTRIC METER COMPANY, OF CHICAGO, ILLINOIS, A CORPORATION OF ILLINOIS.

ELECTRICAL MEASURING INSTRUMENT.

No. 817,857.     Specification of Letters Patent.     Patented April 17, 1906.

Application filed July 31, 1905. Serial No. 271,922.

*To all whom it may concern:*

Be it known that I, JOHN M. LEA, a citizen of the United States, residing at Chicago, in the county of Cook and State of Illinois, have invented a certain new and useful Improvement in Electrical Measuring Instruments, of which the following is a full, clear, concise, and exact description.

My invention relates to an electrical measuring instrument of the class in which a coil adapted to carry the current to be measured, or a definite portion of such current, is arranged to turn in the field of force of a magnet; and the invention relates more particularly to an instrument of the so-called "gravity" type in which the movement of the coil in the magnetic field is opposed not by springs, but by a weight acting on the moving system tending to maintain the coil normally at the zero position.

One feature of the invention involves an improved construction of the magnetic system whereby the deflections of the coil may be made substantially proportional to the strength of the current passing through the same without sacrificing proper lightness of the moving system.

Another feature of the invention contemplates an improvement in the disposition or arrangement of the weighted arms, so that when the coil is in the zero position the weight may be given different adjustments to vary the resistance which it will offer to the movement of the coil, such adjustment being made without shifting the center of gravity of the moving system in such a way as to change the normal zero position of the coil to a harmful degree.

A third feature of the invention relates to the construction by which the ends of the moving coil are mounted upon the coil-frame and connected with the flexible conductors, by which current is conveyed to and from the coil.

An electrical measuring instrument constructed according to my invention is illustrated in the accompanying drawings, in which—

Figure 1 is a front view of the instrument with the cover removed. Fig. 2 is a perspective view indicating the manner in which the moving system may be inserted in and removed from its place between the pole-pieces of the magnet. Fig. 3 is a detail perspective view of one end of the coil-frame much enlarged to illustrate the disposition of the ends of the coil. Fig. 4 is a detail end view of the coil-frame also considerably enlarged. Fig. 5 is a sectional elevation of the moving system and its associated parts. Fig. 6 is a diagram illustrating the construction whereby the weight which opposes the movement of the coil may be adjusted without varying the zero position of said coil to a detrimental degree. Fig. 7 is a diagram illustrating the construction of the pole-pieces, which makes it possible for the movements of the coil to be made substantially proportional to the current passing through it, which causes the deflection. Fig. 8 is a detail view illustrating the manner of attaching the needle and hub to the coil-frame.

The same characters of reference are used to designate the same parts wherever they are shown.

The moving coil is wound upon the inner side of a coil-frame 8 of non-magnetic metal, which is pivoted upon its axis to turn in the magnetic field between two opposing pole-pieces 9 9 of a permanent magnet 10. The coil-frame, as shown, is rectangular and embraces a cylindrical core 11, which being located between the pole-pieces 9 coöperates with them to form a substantially annular field of force in which the coil-frame turns concentrically with the axis of said core.

By reference to Figs. 2 and 5 it will be seen that the coil-frame is provided with pivotal bearings in the arms 12 of a U-shaped yoke-piece 13, which also carries the core 11, about which the coil-frame turns. The yoke-piece 13, together with the core and the moving coil, constitute the "movement," which is adapted to be supported between the pole-pieces 9 by screws 13ª passing through said yoke-piece into the pole-pieces 9. By reference to Fig. 2 particularly it will be seen that the movement may be readily inserted in or removed from the magnetic system by sliding longitudinally between the pole-pieces.

As shown most clearly in Figs. 3 and 4, the ends of the wire forming the coil are led out around opposite edges at the end of the coil-frame and are secured on either side of the axis of the coil between insulated washers 14. By this construction the coil-frame is kept entirely free from any electrical connection with the circuit. The coil-frame is provided with hubs 15 16, which may be riveted at its opposite ends. The extremities of said hubs carry the jewels 17, in which the points of the pivot-screws 18 are centered, the coil-frame being thus mounted to turn freely upon the jeweled bearings. As shown in the detail sectional view Fig. 5, the insulating-washers 14, between which the ends of the coil are secured, may be held between the shoulder of the hub 15 and the coil-frame 8, to which said hub is riveted. The current may be led to and from the coil by means of very fine flexible conductors 19, which are soldered to the projecting ends of the coil held between washers 14, said flexible conductors 19 being anchored upon an insulating-piece 20, supported upon one of the arms 12 of the U-shaped bracket 13. The flexible conductors 19 simply serve to convey the current and do not resist or assist to an appreciable degree the movement of the coil in its bearings.

One of the features of this invention consists in the formation of the magnetic circuit in such a way as to establish a field gradually decreasing in strength in the direction in which the coil tends to turn under the influence of the current passing through the same. This may be accomplished by cutting away the inner faces of the pole-pieces 9 in such a manner that the air-gap between the faces of said pole-pieces and the core 11 will be considerably wider toward the end of the path in which the coil moves under the current than at the beginning of said path. The reason for this construction is as follows: I have found that in the gravity type of instrument if the magnetic field through which the coil moves is of uniform density (as commonly provided) the deflections of the coil for a given increase of current will be much greater toward the end of the arc of movement of the coil than they are at the beginning. In other words, the scale of the instrument would have much wider divisions toward the end. The reason for this is that when a comparatively light opposing weight is used the resisting moment developed thereby as the coil is turned does not increase proportionally with the torque developed by the passing of the current. Thus, referring to Fig. 7, normally the center of gravity of the weighted coil, which is free to turn, will lie below the axis of said coil in a vertical plane passing through said axis—for instance, at the point $a$. This will be the zero position of the coil. Now as the coil rotates upon its axis in the direction of the arrow the center of gravity is moved from the point $a$ in a quadrant or arc toward the point $b$. As the coil is turned through this quadrant it will be readily understood that the resistance caused by gravity opposing the rotation of the coil will increase not directly in proportion to the length of the arc through which the coil turns, but in proportion to the sine of the angle of deflection. As the center of gravity approaches the limit $b$ of its motion, therefore, the moment tending to resist the motion of the coil will not bear the same relation to the factors tending to produce the torque that it did in the first part of the swing from the zero position.

If a comparatively heavy weight were used, the length of the lever-arm being limited by the dimensions of the containing-case of course a sufficient resisting moment might be obtained; but in the type of instrument under consideration, where the moving system must be kept extremely light, so as to require very little expenditure of energy when operating it, the use of a heavy weight is objectionable, so that in gravity instruments of this type heretofore in use it has been common to calibrate the scale with unequal divisions increasing in length toward the end of the scale.

In accordance with my invention I so form the magnetic system that the field through which the coil moves will gradually decrease in strength toward the end of the arc of such movement, so that a given increase of current will produce a torque substantially proportional to the resisting moment developed by the very light weight employed. By this means I am enabled to secure a deflection of the coil through an arc which will be substantially proportional to the increase of current through the coil, no matter in what part of the field the coil may lie, whether at the beginning or near the end of its arc of movement. As shown in the drawings, this decrease in the strength of the field is secured by increasing the width of the air-gap toward the end of the arc of movement of the coil, this increase in the width of the air-gap causing an unequal distribution of the flux, such that the density decreases toward the end of the arc. This increase in the width of the air-gap may be provided by cutting the curved inner face of the pole-pieces eccentric to the arc in which the coil moves.

The degree of eccentricity can readily be determined by experiment for any given size of instrument. I have found that it is desirable to cut away the pole-piece eccentrically only along the latter half of the quadrant through which the coil turns, as during the first forty-five degrees of the arc the resisting moment is substantially proportional to the torque produced by a given increase of current when suitable weight is used. In practice I form the pole-pieces by first milling the faces thereof concentric with the axis about which the coil is to turn, after which I use a slightly larger milling-cutter set over a sufficient distance to cut away the portion of the pole-face toward the end of the arc through which the coil is to swing without changing the curvature of the first half of the quadrant. Thus with reference to Fig. 7 the first cut of the pole-piece will be made by a cutter set on the center $c$, after which the pole-faces are finished by slightly larger cutters set on the centers $c'$ and $c^2$, respectively, each pole-piece of course being milled separately.

The system of weights for the coil is indicated in Fig. 1 and in the diagram Fig. 6. The weight 21 is a counterbalance for the needle 22 and for a second weight 23, which is adjustably mounted upon the vertically-depending frame 24. It has been the practice heretofore to provide two weights for the moving element of the measuring instrument, said weights being mounted on arms set at a right angle to each other, so that by adjusting the weights along said arms the center of gravity may be shifted as desired.

My invention involves the further improvement that the weight which serves to oppose the motion of the coil may be adjusted toward or from the axis of the coil to vary the resisting moment which it will offer without shifting the center of gravity of the moving system from a vertical plane, and so without changing the zero position of the coil. For this reason the arm 24, which carries the weight 23, is bent so that the outer portion thereof hangs normally in a substantially vertical position.

By reference to Fig. 6 it will be seen that the weight 23 may be moved a considerable distance along the vertical portion of arm 24 while the coil is in its zero position without changing the effect of this weight as a balance to the weight 21, and so without changing the zero position. This vertical adjustment of the weight 23 will, however, vary its radial distance from the axis of the coil, and so will vary the leverage which it has upon the coil tending to oppose the rotation thereof. It will thus be seen that after th. weight 21 is adjusted to properly counterbalance the needle 22 the weight 23 may then be adjusted to exert any desired opposing force to the rotation of the coil without changing the zero position thereof. This will be desirable, for example, in case of a change of strength of the relative forces acting after the instrument has been calibrated, as by this adjustment the readings of the instrument may be brought again to respond to the original calibration. Such an adjustment is also desirable during assembly of the instrument to compensate for variations which may occur in the dimensions or relative positions of the parts during the process of manufacture.

The indicating-needle 22 is secured to the hub 16 preferably as shown in Fig. 5—that is, by being passed through a transverse hole in said hub. The lower end of the needle projecting beyond the hub is threaded, as shown, to receive the counterbalance-weight 21. In cutting the threads on the needle the material is slightly burred, so that the effective diameter of the needle near the upper end is slightly larger than the unthreaded portion. In manufacture a hole may be bored through the hub 16 of just the right size to receive the needle, which is drawn through the hole (the spade end 25 of the needle not being yet attached) and is pulled through the hub until the threads formed at the lower end of the needle are jammed into the hole, thus making a tight fit. After the needle is in position it may further be secured, if desirable, by a drop of shellac or the like.

The weight-arm 24 may conveniently be secured to the moving system by being fastened between the shoulder of the hub and the surface of the coil-frame. The riveting of the hub to the coil-frame serves to bind the end of the weight-arm fixedly to the coil-frame. The weight-arm 24 is preferably threaded its entire length for convenience in manufacture, and also to secure rigidity by the flow of a sticking compound, such as shellac, between the threads where said arm is riveted.

I claim—

1. In an electrical measuring instrument, the combination with a coil pivoted to turn upon a substantially horizontal axis, of a weight carried by said coil, acting to maintain said coil normally in a zero position and opposing the rotation thereof, a permanent magnet having concave opposite polar faces, a core between said polar faces, about which said coil is axially rotatable, said polar faces being shaped to establish a magnetic field decreasing in strength in the direction in which the coil turns under the influence of an electric current passing through the same; whereby the deflections of said coil are rendered substantially proportional to the current.

2. In an electrical measuring instrument, the combination with a coil and an indicator adapted to be moved thereby, of a central core about which said coil is axially pivoted to turn, a weight for yieldingly maintaining said coil at a zero position, and a magnet having concave opposite polar faces on opposite sides of said core, curved eccentrically with respect to said core to produce an air-gap increasing in width toward the limit of the movement of said coil therein.

3. In an electrical measuring instrument, the combination with a moving coil, of a coil-frame having pivot-hubs at the ends thereof, a pair of insulating-washers at one end of said hubs, the ends of the wire forming the coil being secured between said washers, and fine flexible conductors fastened to said wire ends and anchored at their other ends to a support.

4. In an electrical measuring instrument, the combination with a moving coil, of a coil-frame upon the inner side whereof the coil is supported, hubs riveted to opposite ends of said frame, jewel-bearings carried by said hubs, fixed pivot-screws having points entering said jewel-bearings, a pair of insulating-washers interposed between the coil-frame and one of said hubs, the ends of the wire of the coil being passed over the edge of the coil-frame and across the end thereof between said washers, on opposite sides of said hub, and fine flexible conductors fastened to the respective ends of said coil-wire and anchored to a support, said conductors serving to convey current to and from the coil.

5. In an electric measuring instrument, the combination with a moving element, of a pivotal hub therefor, a transverse hole through said hub, and an indicating-needle having a threaded end, said needle being drawn through said hole until said threaded end jams therein, whereby the needle is fixed in position.

6. In an electrical measuring instrument, the combination with the coil-frame, of a hub riveted thereto, and a weight-arm bound between the shoulder of the hub and said coil-frame and fastened by the riveting thereof.

In witness whereof I hereunto subscribe my name this 25th day of July, A. D. 1905.

JOHN M. LEA.

Witnesses:
AUGUST BENSON,
DE WITT C. TANNER.